US012578795B2

(12) United States Patent
Kurfirst et al.

(10) Patent No.: US 12,578,795 B2
(45) Date of Patent: Mar. 17, 2026

(54) SYSTEMS AND METHODS FOR OBTAINING AND USING ELECTROENCEPHALOGRAPHY SIGNALS TO PERFORM AN ACTION

(71) Applicant: CVS Pharmacy, Inc., Woonsocket, RI (US)

(72) Inventors: Dwayne Kurfirst, Woonsocket, RI (US); Neema Athia, Woonsocket, RI (US)

(73) Assignee: CVS Pharmacy, Inc., Woonsocket, RI (US)

( * ) Notice: Subject to any disclaimer, the term of this patent is extended or adjusted under 35 U.S.C. 154(b) by 61 days.

(21) Appl. No.: 18/622,323

(22) Filed: Mar. 29, 2024

(65) Prior Publication Data

US 2025/0306679 A1 Oct. 2, 2025

(51) Int. Cl.
*G06F 3/01* (2006.01)
*G06N 20/00* (2019.01)

(52) U.S. Cl.
CPC .............. *G06F 3/015* (2013.01); *G06F 3/016* (2013.01); *G06N 20/00* (2019.01)

(58) Field of Classification Search
CPC ...................................................... G06F 3/016
USPC ......................................................... 345/156
See application file for complete search history.

(56) References Cited

U.S. PATENT DOCUMENTS 3,886,314 A 5/1975 Pori
5,740,812 A 4/1998 Cowan 7,072,476 B2 7/2006 White et al.
8,123,660 B2 2/2012 Kruse et al.
(Continued)

FOREIGN PATENT DOCUMENTS

CN 111723717 A 9/2020
CN 114831652 A 8/2022
(Continued)

OTHER PUBLICATIONS

Ahmed, Ryan, "Does Electroencephalography Enable a Future Where Mind Reading is Possible?" The Science Survey https://thesciencesurvey.com/editorial/2022/04/24/does-electroencephalography-enable-a-future-where-mind-reading-is-possible/ (Apr. 24, 2022).
(Continued)

*Primary Examiner* — Calvin C Ma
(74) *Attorney, Agent, or Firm* — Leydig, Voit & Mayer, Ltd.

(57) ABSTRACT

A method is provided. The method comprises obtaining, using electroencephalogram (EEG) sensors, a first set of EEG signals that comprises a plurality of first waveforms, and each of the plurality of first waveforms is associated with a frequency band from a plurality of frequency bands; training a plurality of machine learning-artificial intelligence (ML-AI) models using the first set of EEG signals, wherein each of the plurality of ML-AI models is trained for a different frequency band; obtaining, using the EEG sensors, a second set of EEG signals, wherein the second set of EEG signals comprises a plurality of second waveforms; inputting each of the plurality of second waveforms associated with the frequency band into a corresponding ML-AI model associated with the respective frequency band to generate a plurality of outputs; and performing one or more actions based on the plurality of outputs.

20 Claims, 5 Drawing Sheets

(56) References Cited

U.S. PATENT DOCUMENTS

| | | | |
|---|---|---|---|
| 8,392,250 | B2 | 3/2013 | Pradeep et al. |
| 9,451,883 | B2 | 9/2016 | Gallant et al. |
| 9,576,460 | B2 | 2/2017 | Dayal |
| 9,578,307 | B2 | 2/2017 | Moore et al. |
| 9,697,336 | B2 | 7/2017 | Hyde |
| 9,773,332 | B2 | 9/2017 | Urbach |
| 9,922,236 | B2 | 3/2018 | Moore et al. |
| 10,024,667 | B2 | 7/2018 | Moore et al. |
| 10,234,942 | B2 | 3/2019 | Connor |
| 10,264,990 | B2 | 4/2019 | Pasley et al. |
| 10,542,355 | B2 | 1/2020 | Petersen et al. |
| 10,573,335 | B2 | 2/2020 | Moghadamfalahi et al. |
| 10,606,353 | B2 | 3/2020 | Ce Coleman et al. |
| 10,959,639 | B2 | 3/2021 | Kidmose et al. |
| 10,990,175 | B2 | 4/2021 | Forsland et al. |
| 11,101,031 | B2 | 8/2021 | Hill et al. |
| 11,228,849 | B2 | 1/2022 | Piechowiak et al. |
| 11,311,220 | B1 * | 4/2022 | Al-Saggaf ............... A61B 5/165 |
| 11,696,714 | B2 | 7/2023 | Aimone et al. |
| 2005/0208457 | A1 | 9/2005 | Fink et al. |
| 2006/0094974 | A1 | 5/2006 | Cain |
| 2009/0082829 | A1 | 3/2009 | Panken et al. |
| 2010/0094154 | A1 | 4/2010 | Schalk et al. |
| 2010/0241350 | A1 | 9/2010 | Cioffi et al. |
| 2011/0018903 | A1 | 1/2011 | Lapstun et al. |
| 2011/0237971 | A1 | 9/2011 | Pradeep et al. |
| 2012/0010522 | A1 | 1/2012 | Knudsen |
| 2012/0092460 | A1 | 4/2012 | Mahoney |
| 2013/0024272 | A1 | 1/2013 | Pradeep et al. |
| 2013/0046541 | A1 | 2/2013 | Klein et al. |
| 2014/0085446 | A1 | 3/2014 | Hicks |
| 2015/0112153 | A1 | 4/2015 | Nahum |
| 2015/0164361 | A1 | 6/2015 | Lunner |
| 2015/0219757 | A1 | 8/2015 | Boelter et al. |
| 2015/0338917 | A1 | 11/2015 | Steiner |
| 2016/0077547 | A1 | 3/2016 | Aimone et al. |
| 2016/0220122 | A1 | 8/2016 | Luna et al. |
| 2017/0259167 | A1 | 9/2017 | Cook et al. |
| 2019/0223747 | A1 | 7/2019 | Chou |
| 2019/0295566 | A1 | 9/2019 | Moghadamfalahi et al. |
| 2020/0201435 | A1 | 6/2020 | Ciccarelli |
| 2020/0337653 | A1 | 10/2020 | Alcaide et al. |
| 2021/0223864 | A1 * | 7/2021 | Forsland ................... G06N 5/02 |
| 2021/0275050 | A1 | 9/2021 | Ren et al. |
| 2021/0370064 | A1 * | 12/2021 | Murphy ............... G06N 3/0442 |
| 2022/0155867 | A1 | 5/2022 | Connor |
| 2022/0401004 | A1 * | 12/2022 | Othmane ............... A61B 5/384 |

FOREIGN PATENT DOCUMENTS

| | | |
|---|---|---|
| CN | 115105093 A | 9/2022 |
| CN | 115774856 A | 3/2023 |
| EP | 2 442 714 A1 | 4/2012 |
| EP | 3 011 895 A1 | 4/2016 |
| KR | 102415719 B1 | 7/2022 |
| WO | WO 2010/147913 A1 | 12/2010 |
| WO | 2011/150407 A2 | 12/2011 |

OTHER PUBLICATIONS

Ahvenainen, Jouko "The Metaverse is Coming for your Biometric and Health Data," https://medium.com/prifina/the-metaverse-is-coming-for-your-biometric-and-health-data-1d185a93519c (2022).
Awais et al., "LSTM-Based Emotion Detection Using Physiological Signals: IoT Framework for Healthcare and Distance Learning in COVID-19" *IEEE Internet Things J.*, 8(23): 16863-16871 (2021).

Bouteraa, Yassine "Design and Development of a Wearable Assistive Device Integrating a Fuzzy Decision Support System for Blind and Visually Impaired People," *Micromachines*, vol. 12 (Sep. 7, 2021).
CoinYuppie, "Special research on the Metaverse Industry: VR, AR and Brain-Computer Interface are the Entrance to the Metaverse," *CoinYuppie* (Jun. 28, 2022).
Craig, Emory, "The Future: Our Minds as the Ultimate VR and AR Interface," https://www.digitalbodies.net/future-minds-next-vr-ar-interface/ (Jan. 17, 2018).
Falk, Tiago H. "Wearable Brain-Computer Interfaces and VR: Neuroergonomics Meets the Metaverse," ICHMS, https://www.ise.ufl.edu/ichms2022/wearable-brain-computer-interfaces-and-vr-neuroergonomics-meets-the-metaverse/ (2022).
Farber, Dan, "Microsoft Looks to Brain for User Interface Design," ZDNET, https://www.zdnet.com/article/microsoft-looks-to-brain-for-user-interface-design/ (Oct. 15, 2007).
Hayden, Scott "Valve, OpenBCI, & Tobii to Launch VR Brain-Computer Interface 'Galea' in Early 2022" https://www.roadtovr.com/valve-openbci-immersive-vr-games/ (Feb. 5, 2021).
Huynh-The et al., "Artificial Intelligence for the Metaverse: A Survey," https://arxiv.org/pdf/2202.10336.pdf (Feb. 15, 2022).
"Isodiol International Acquires Global Rights to Produce Products Under an Innovative Delivery System Patent" https://www.econotimes.com/Isodiol-International-Acquires-Global-Rights-to-produce-products-under-an-Innovative-Delivery-System-Patent-1061797 (Dec. 15, 2017).
Kurkin et al., "Artificial intelligence systems for classifying EEG responses to imaginary and real movements of operators" Proc. of SPIE, 11067 (2019).
Meltzner et al., "Silent Speech Recognition as an Alternative Communication Device for Persons with Laryngectomy" *IEEE/ACM Trans Audio Speech Lang Process, Author manuscript* (2018).
"Mind-Reading Algorithm Uses EEG Data to Reconstruct Images Based on What we Perceive," University of Toronto, https://www.sciencedaily.com/releases/2018/02/180222145037.htm (Feb. 22, 2018).
"Microsoft Seeks Mind-Reading Patent," Nicholas Carr's Blog, https://www.roughtype.com/?p=932 (Oct. 15, 2007).
Mohanchandra et al., "Using Brain Waves as New Biometric Feature for Authenticating a Computer User in Real Time" *Int. J. Biometrics and Bioinformatics*, 7(1) (2013).
Murphy, Mike "Ready for Bionic Virtual Reality Meetings? Apple Thinks So," *Protocol* (Feb. 22, 2020).
Nash, Jim, "No Muss, No Fuss Wireless EEG Setup Used to Control a Game with Thoughts," Biometric Update.com, https://www.biometricupdate.com/202108/no-muss-no-fuss-wireless-eeg-setup-used-to-control-a-game-with-thoughts (Aug. 16, 2021).
Panachakel, Jerrin Thomas "No Longer Science Fiction: Mind Reading Through EEG Could Soon Become Reality," Frontiers Science News, https://blog.frontiersin.org/2021/04/29/frontiers-mind-reading-eeg-electroencephalography-panachakel-ganesan-indian-institute-of-science/ (Apr. 29, 2021).
"Patients Could Use Biosignals to Control VR Avatars: KIST Patent Application," https://parolaanalytics.com/patients-could-use-biosignals-to-control-vr-avatars-kist-patent-application/ (Mar. 10, 2021).
Rayome, Alison DeNisco "Microsoft Files Patent for . . . Computer Mind Control?" *TechRepublic,,* (Jan. 12, 2018).
"Using AI to Decode Speech from Brain Activity" Meta AI, https://ai.facebook.com/blog/ai-speech-brain-activity/ (Aug. 31, 2022).
"XR Health Receives Patent for Incorporation of Biofeedback into its XR Therapy Solutions," https://www.auganix.org/xrhealth-receives-patent-for-incorporation-of-biofeedback-into-its-xr-therapy-solutions/ (Sep. 15, 2020).

* cited by examiner

202

Bus

Processor ~ 204

ROM ~ 206

RAM ~ 208

Storage ~ 210

Network Interface ~ 212

200

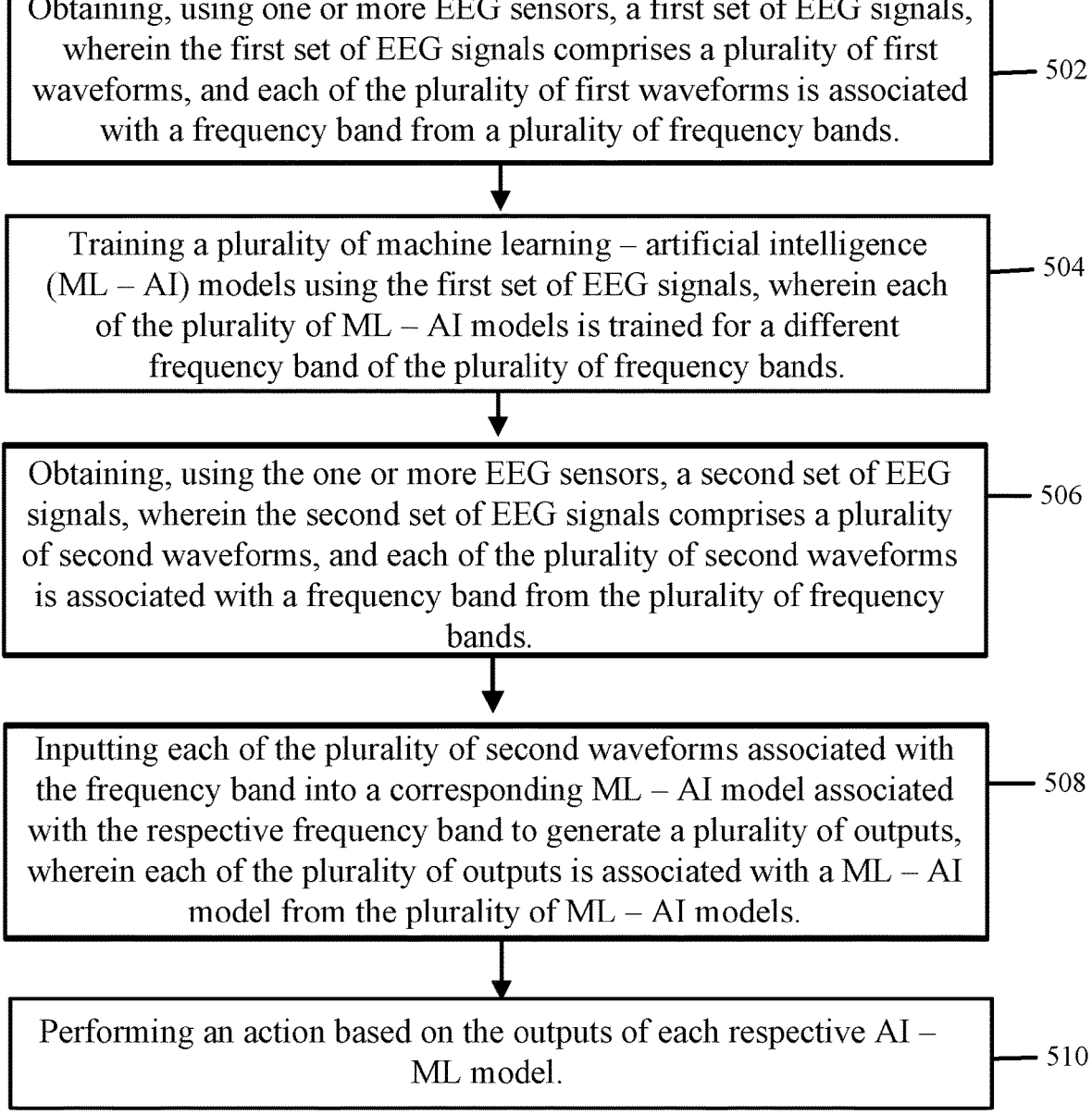

Obtaining, using one or more EEG sensors, a first set of EEG signals, wherein the first set of EEG signals comprises a plurality of first waveforms, and each of the plurality of first waveforms is associated with a frequency band from a plurality of frequency bands. — 502

Training a plurality of machine learning – artificial intelligence (ML – AI) models using the first set of EEG signals, wherein each of the plurality of ML – AI models is trained for a different frequency band of the plurality of frequency bands. — 504

Obtaining, using the one or more EEG sensors, a second set of EEG signals, wherein the second set of EEG signals comprises a plurality of second waveforms, and each of the plurality of second waveforms is associated with a frequency band from the plurality of frequency bands. — 506

Inputting each of the plurality of second waveforms associated with the frequency band into a corresponding ML – AI model associated with the respective frequency band to generate a plurality of outputs, wherein each of the plurality of outputs is associated with a ML – AI model from the plurality of ML – AI models. — 508

Performing an action based on the outputs of each respective AI – ML model. — 510

SYSTEMS AND METHODS FOR OBTAINING AND USING ELECTROENCEPHALOGRAPHY SIGNALS TO PERFORM AN ACTION

BACKGROUND

When the brain produces a thought, the brain creates action potentials across synapses that generate electrical activity in the brain for that thought. Electroencephalograms (EEG) (whether non-invasive for intracranial EEG) may be used to record that electrical activity of a brain. The recorded electrical activity of the brain for even a simple action or thought typically includes a collection of different, near-simultaneously generated electrical signals at different frequencies, amplitudes, and speeds, and that collection of signals may be a combination of signals unique to how that user forms that thought or action. However, traditional devices and/or system have focused on the use of extracting a single frequency at a time from among the combination of signals. Furthermore, while traditional devices and/or system may be able identify a specific frequency in isolation from the combination of signals, processing multiple frequencies of EEG signals of a user with enough accuracy and/or efficiency to associate the combination of signals with a specific thought, idea, emotion, and/or action of a user poses difficulties. Accordingly, there remains a technical need to provide devices and systems that are able to utilize multiple frequencies and wave packets of the combination of electrical signals produced by a user's brain to aid that user.

SUMMARY

In some examples, the present application may use an EEG system to help a user perform an action the user desires to perform. For instance, the EEG system may be an EEG headset that may use one or more EEG sensor(s) to obtain information on the electrical signals generated (e.g., produced) by a user's brain (e.g., when the user wants to communicate non-verbally to another user or entity or the user desires to operate a device by unlocking the device or causing the device to produce an output). The EEG system (e.g., via the EEG headset and/or an enterprise computing system) may then generate a first set of EEG signals from the obtained collection of electrical signals generated by the user's brain, for example, by decomposing the received collection of electrical signals into its constituent waveforms of each frequency band (e.g., thereby producing a single waveform or wave packet within each frequency band). The data (e.g., waveform data) from the first frequency band may then be prepared (e.g., preprocessed) and provided as an input to a first Machine Learning-Artificial Intelligence (ML-AI) model that is trained on data from that first frequency band to determine when the waveforms (e.g., wave packet) of the first frequency band indicate the user has reacted to a known stimulus (e.g., seen an image or person the model has been trained on) or produced a known thought (e.g., providing consent or answering no). The data from the second frequency band may then be prepared and provided as an input to a second ML-AI model to determine when the waveforms of the second band frequency indicate the user has reacted to the same known stimulus or known thought. This may be performed for each frequency band considered for the respective thought or action (e.g., if there are six frequency bands, then the waveforms of each of the six frequency bands are provided to a respective ML-AI model from a plurality of six ML-AI models). The output of each ML-AI model (e.g., all six outputs) may then be considered together to determine whether to validate and perform the given action, such as unlocking a smartphone, providing consent, or instructing a haptic vest to simulate a hug.

Moreover, because impaired users (e.g., audio or visually impaired users, physically impaired, and/or mentally impaired) may still generate readable and consistent EEG signals for the same specific thought, idea, emotion, and/or action, utilizing the user's EEG activity to assist those users (e.g., for communication or operating devices) may greatly aid these users. This will be described in further detail below.

In one aspect, a system is provided. The system comprises an electroencephalogram (EEG) utilization device comprising: one or more EEG sensors configured to detect EEG signals generated by a brain of a user, wherein the one or more EEG signals comprise waveforms corresponding to a plurality of frequency bands; and one or more processors configured to provide the detected EEG signals to an enterprise computing system. The system also comprises the enterprise computing system, wherein the enterprise computing system is configured to: obtain a first set of EEG signals from the EEG utilization device, wherein the first set of EEG signals comprises a plurality of first waveforms, and each of the plurality of first waveforms is associated with a frequency band from the plurality of frequency bands; train a plurality of machine learning-artificial intelligence (ML-AI) models using the first set of EEG signals, wherein each of the plurality of ML-AI models is trained for a different frequency band of the plurality of frequency bands; obtain a second set of EEG signals from the EEG utilization device, wherein the second set of EEG signals comprises a plurality of second waveforms, and each of the plurality of second waveforms is associated with a frequency band from the plurality of frequency bands; input each of the plurality of second waveforms associated with the frequency band into a corresponding ML-AI model associated with the respective frequency band to generate a plurality of outputs, wherein each of the plurality of outputs is associated with a ML-AI model from the plurality of ML-AI models; and based on the plurality of outputs from the plurality of ML-AI models, provide one or more instructions to the EEG utilization device to direct the EEG utilization device to perform one or more actions.

Examples may include one of the following features, or any combination thereof. For instance, in some examples, performing the one or more actions further comprises providing, to a user device, a response to a query requesting authentication of a user.

In some variations, the system further comprises at least one haptic sensory output device in haptic communication with a user, comprising one or more processors configured to: receive, from the EGG utilization device, the direction to perform one or more actions; and produce a haptic output based on the received direction.

In some instances, the system further comprises at least one sensory output device comprising one or more processors configured to: receive, from the EEG utilization device, the direction to perform the one or more actions; and execute the direction to perform the one or more actions by using the at least one sensory output device to produce a sensory output comprising at least one of an olfactory, sound, taste, or visual output.

In some examples, providing one or more instructions to the EEG utilization device is further based on a comparison of each output of the plurality of outputs from the plurality of ML-AI models to a corresponding predetermined value associated with the action for that respective ML-AI model.

In some variations, the one or more EEG sensors are further configured to detect at least one EEG signal in response to a predetermined stimulus, and wherein the corresponding predetermined value is used for the comparison based on the predetermined stimulus.

In some instances, the one or more processors of the EEG device are further configured to: obtain the plurality of second waveforms by sampling the second set of EEG signals in a sequential order using a dynamic sampling rate based on a respective predetermined frequency of each frequency band of the plurality of frequency bands.

In some examples, obtaining the plurality of second waveforms further comprises: applying a Fast Fourier Transform (FFT) function separately to each of plurality of second waveforms of each frequency band of the plurality of frequency bands, and wherein inputting each of the plurality of second waveforms into a corresponding ML-AI model further comprises providing the output of each FFT function to the respective ML-AI model as the plurality of second waveforms.

In some variations, the one or more EEG sensors are further configured to detect the second set of EEG signals in response to a predetermined stimulus, and wherein the dynamic sampling rate is further based on the predetermined stimulus.

In another aspect, a method is provided. The method comprises: obtaining, using one or more EEG sensors, a first set of EEG signals, wherein the first set of EEG signals comprises a plurality of first waveforms, and each of the plurality of first waveforms is associated with a frequency band from a plurality of frequency bands; training a plurality of machine learning-artificial intelligence (ML-AI) models using the first set of EEG signals, wherein each of the plurality of ML-AI models is trained for a different frequency band of the plurality of frequency bands; obtaining, using the one or more EEG sensors, a second set of EEG signals, wherein the second set of EEG signals comprises a plurality of second waveforms, and each of the plurality of second waveforms is associated with a frequency band from the plurality of frequency bands; inputting each of the plurality of second waveforms associated with the frequency band into a corresponding ML-AI model associated with the respective frequency band to generate a plurality of outputs, wherein each of the plurality of outputs is associated with a ML-AI model from the plurality of ML-AI models; and performing one or more actions based on the plurality of outputs.

In some instances, performing the action further comprises providing a response to a query, received from a user device, requesting authentication of a user.

In some examples, performing the action further comprises: providing a control signal to at least one sensory output device to produce a sensory output comprising at least one of an olfactory, sound, taste, or visual output.

In some variations, performing the action further comprises: providing a control signal to at least one haptic sensory output device in haptic communication with a user, wherein the control signal directs the at least one haptic sensory output device to produce a haptic output.

In some instances, the method further comprises determining a control signal for performing the action based on a comparison of each of the outputs of each respective ML-AI model to a corresponding predetermined value for that respective ML-AI model associated with the action.

In some examples, obtaining the second set of EEG signals further comprises obtaining, using the one or more EEG sensors, the second set of EEG signals in response to a predetermined stimulus, and wherein the corresponding predetermined value is used for the comparison based on the predetermined stimulus.

In some variations, the predetermined value is based on the output of the respective ML-AI model trained on the first set of EEG signals generated by a brain of a same user as the second set of EEG signals.

In some instances, the method further comprises generating the plurality of second waveforms by sampling the second set of EEG signals in a sequential order, wherein the sampling rate is a dynamic sampling rate based on each frequency of the plurality of frequency bands, and wherein the plurality of frequency bands are each based on a respective predetermined frequency.

In some instances, generating the different waveform subsets further comprises: applying an FFT function separately to each of plurality of second waveforms of each frequency band of the plurality of frequency bands, and wherein inputting each of the plurality of second waveforms further comprises inputting the output of each FFT function to the respective ML-AI model.

In some examples, wherein obtaining the second set of EEG signals further comprises obtaining, using the one or more EEG sensors, the second set of EEG signals in response to a predetermined stimulus, and wherein the dynamic sampling rate is further based on the predetermined stimulus.

In yet another aspect, a non-transitory computer-readable medium having processor-executable instructions stored thereon is provided. The processor-executable instructions, when executed, facilitate: obtaining, using one or more EEG sensors, a first set of EEG signals, wherein the first set of EEG signals comprises a plurality of first waveforms, and each of the plurality of first waveforms is associated with a frequency band from a plurality of frequency bands; training a plurality of machine learning-artificial intelligence (ML-AI) models using the first set of EEG signals, wherein each of the plurality of ML-AI models is trained for a different frequency band of the plurality of frequency bands; obtaining, using the one or more EEG sensors, a second set of EEG signals, wherein the second set of EEG signals comprises a plurality of second waveforms, and each of the plurality of second waveforms is associated with a frequency band from the plurality of frequency bands; inputting each of the plurality of second waveforms associated with the frequency band into a corresponding ML-AI model associated with the respective frequency band to generate a plurality of outputs, wherein each of the plurality of outputs is associated with a ML-AI model from the plurality of ML-AI models; and performing one or more actions based on the plurality of outputs.

All examples and features mentioned above may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following:

FIG. 5 is an exemplary process for using an EEG utilization device in accordance with one or more examples of the present application.

DETAILED DESCRIPTION

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
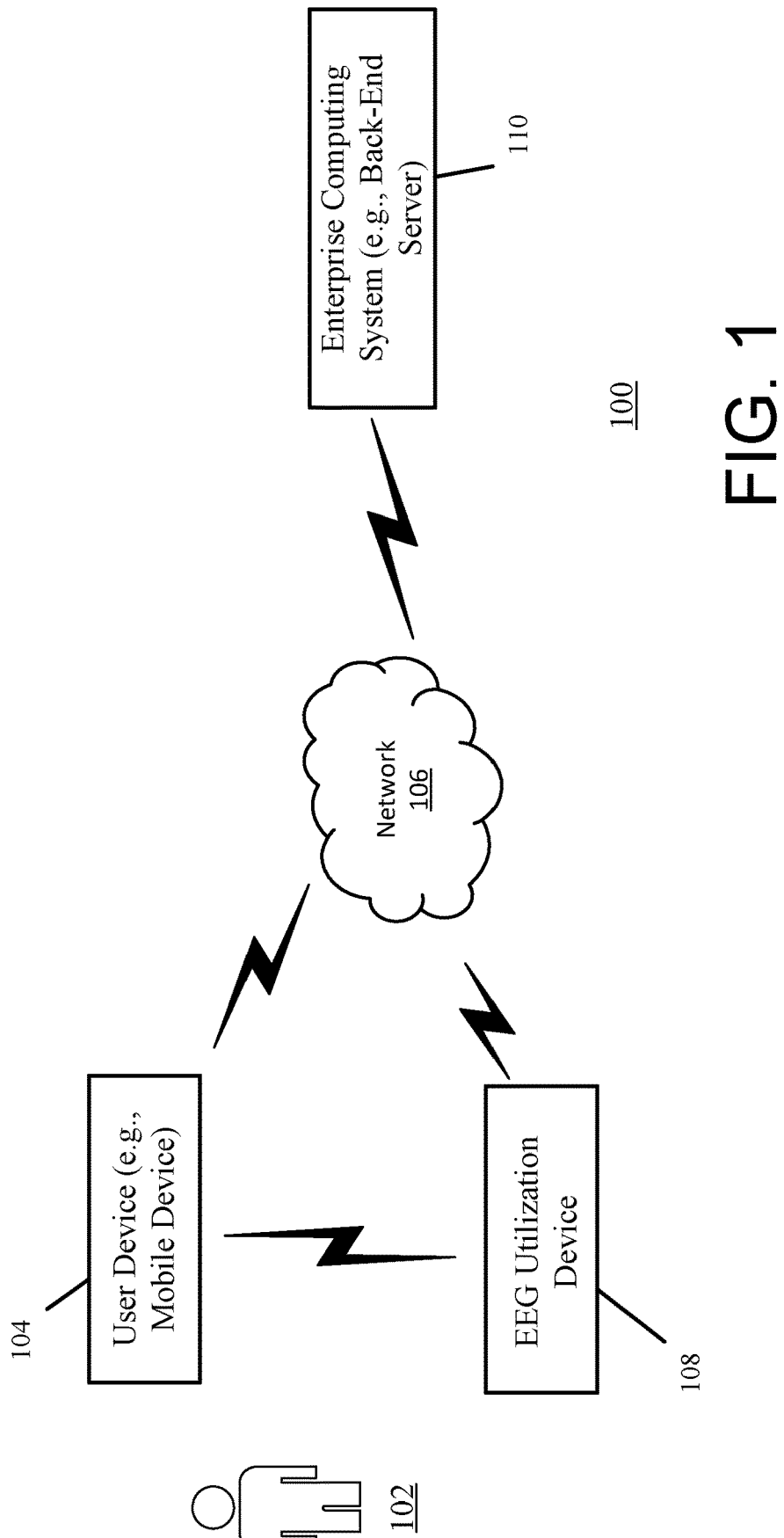
FIG. 1 is a simplified block diagram depicting an exemplary computing environment in accordance with one or more examples of the present application.

Systems, methods, and computer program products are herein disclosed that provide for using electroencephalogram (EEG) signals to communicate and perform actions based thereon. FIG. 1 is a simplified block diagram depicting an exemplary environment in accordance with an example of the present application. The environment 100 includes an individual (e.g., user) 102, a user device (e.g., mobile device) 104 associated with the individual 102 (e.g., a user), an EEG utilization device 108, and an enterprise computing system (e.g., back-end server) 110. Collectively, the EEG utilization device 108 and the enterprise computing system 110 may be referred to as an EEG system. Although the entities within environment 100 may be described below and/or depicted in the FIGS. as being singular entities, it will be appreciated that the entities and functionalities discussed herein may be implemented by and/or include one or more entities.

The entities within the environment 100 such as the user device 104, the EEG utilization device 108, and the enterprise computing system 110 may be in communication with other systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100. Additionally, and/or alternatively, the user device 104 may be in communication with the EEG utilization device 108 without using the network 106. For instance, the user device 104 may use one or more communication protocols such as WI-FI or BLUETOOTH to communicate with the EEG utilization device 108.

User 102 may operate, own, and/or otherwise be associated with a user device 104. For instance, the user device 104 may be a mobile phone such as a smartphone that is owned and/or operated by the user 102. The user 102 may provide information to the other entities of environment 100 such as the EEG utilization device 108 and/or the enterprise computing system 110 using the user device 104. For example, the user device 104 may receive user input from the individual 102 such as indications to download, operate, and/or manage a software application associated with an enterprise organization. The enterprise organization may be any type of corporation, company, organization, and/or other institution. In some instances, the enterprise organization may own, operate, and/or be otherwise associated with one or more storefronts such as retail stores, grocery stores, and/or other facilities that sell products/items, and/or one or more healthcare services and/or facilities. The software application may be an application that is used by the user device 104 to communicate with the EEG utilization device 108 as well as the enterprise computing system 110.

The user device 104 may be and/or include, but is not limited to, a desktop, laptop, tablet, mobile device (e.g., smartphone device or other mobile device), smart watch, an internet of things (IOT) device, or any other type of computing device that generally comprises one or more communication components, one or more processing components, and one or more memory components. The user device 104 may be able to execute software applications managed by, in communication with, and/or otherwise associated with the enterprise organization.

Figure 3:
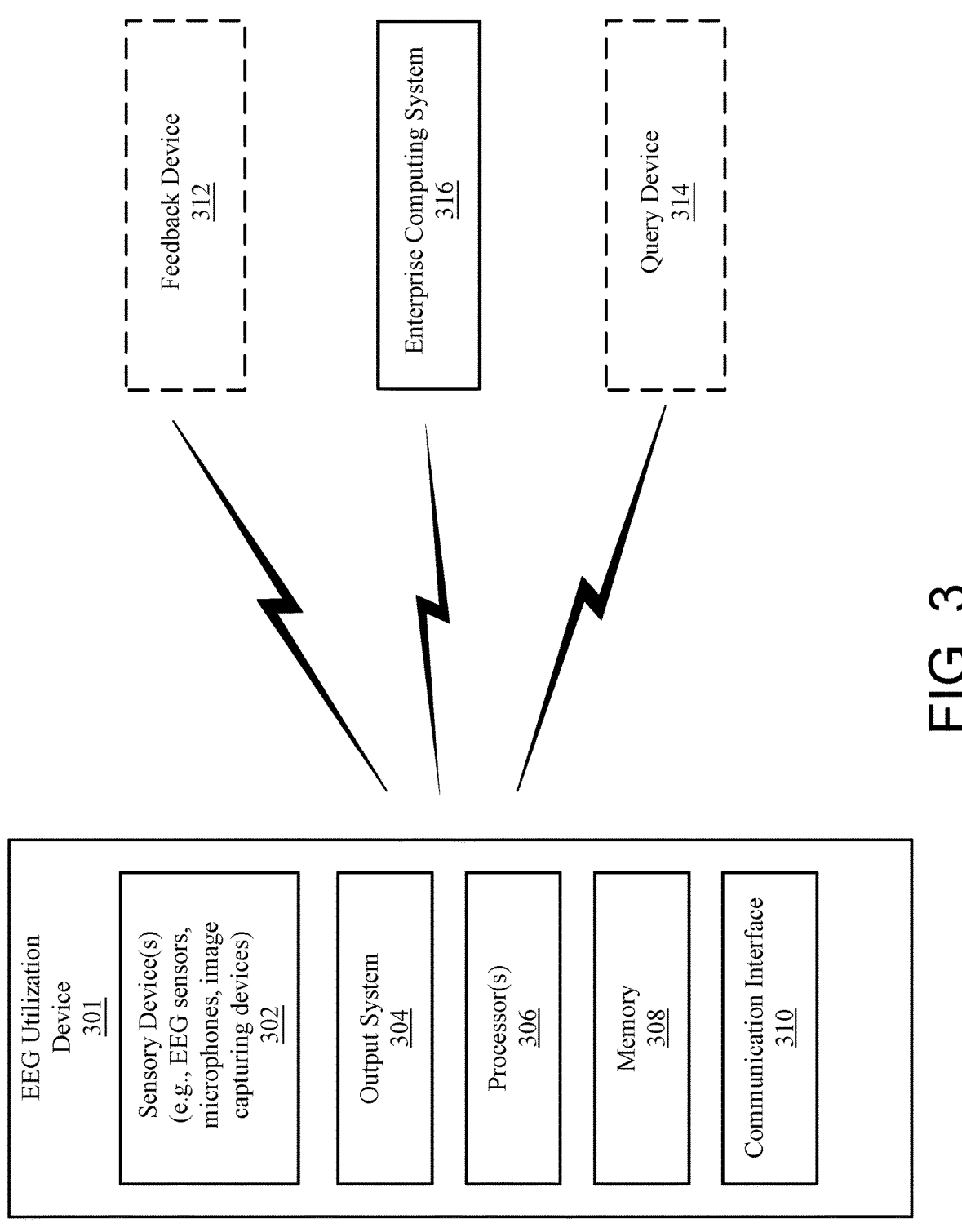
FIG. 3 is a simplified block diagram depicting an exemplary EEG utilization system in accordance with one or more examples of the present application.

The EEG utilization device 108 may be a system and/or part of a system that collects, processes, and transmits EEG signal data of a user 102 such as an EEG system. For example, FIG. 3 is a simplified block diagram depicting an exemplary EEG system 300 in accordance with one or more examples of the present application. Referring to FIG. 3, the EEG utilization device 108 may include an EEG utilization device 301 (e.g., EEG device 301) such as headset device and/or one or more wearable devices. The EEG device 301 may include one or more EEG sensors (e.g., systems of electrodes including one or more recording electrode, reference electrode, and/or ground electrode) and an amplifier configured to detect biosignals in the brain such as electrical signals and/or voltage fluctuations of the brain. The EEG system 300 may further include one or more feedback devices 312 devices such as a haptic feedback device, an olfactory feedback device, and/or additional output devices (e.g., visual or audio output devices). Based on the detected EEG signals, the EEG device 301 may determine an instruction for the one or more feedback devices 312 to perform (e.g., take) some action (e.g., generate a haptic or audio output), and may output the one or more instructions to the feedback device 312. The EEG system 300 may further include one or more query devices 312 devices such as a pay terminal or smartphone that requests a response from the user 102 to a query (e.g., a form of authentication and/or confirmation of the user 102). Based on the detected EEG signals, the EEG device 301 may determine a response to the query and output the response to the query device 314. The functionality, sensors, and/or devices of the EEG system 300 will be described in further detail below.

Referring back to FIG. 1, the enterprise computing system 110 is a computing system that is associated with the enterprise organization. The enterprise computing system 110 includes one or more computing devices, computing platforms, systems, servers, and/or other apparatuses capable of performing tasks, functions, and/or other actions for the enterprise organization. In some instances, the enterprise computing system 110 may, for example, receive and/or provide information from the user device 104 and/or the EEG utilization device 108. The enterprise computing system 110 may be implemented using one or more computing platforms, devices, servers, and/or apparatuses. In some variations, the enterprise computing system 110 may be implemented as engines, software functions, and/or applications. In other words, the functionalities of the enterprise computing system 110 may be implemented as software instructions stored in storage (e.g., memory) and executed by one or more processors.

It will be appreciated that the exemplary environment depicted in FIG. 1 is merely an example, and that the principles discussed herein may also be applicable to other situations—for example, including other types of institutions, organizations, devices, systems, and network configurations. As will be described herein, the environment 100 may be used by health care enterprise organizations. However, in other instances, the environment 100 may be used by other types of enterprise organizations such as financial institutions or insurance institutions.

Figure 2:
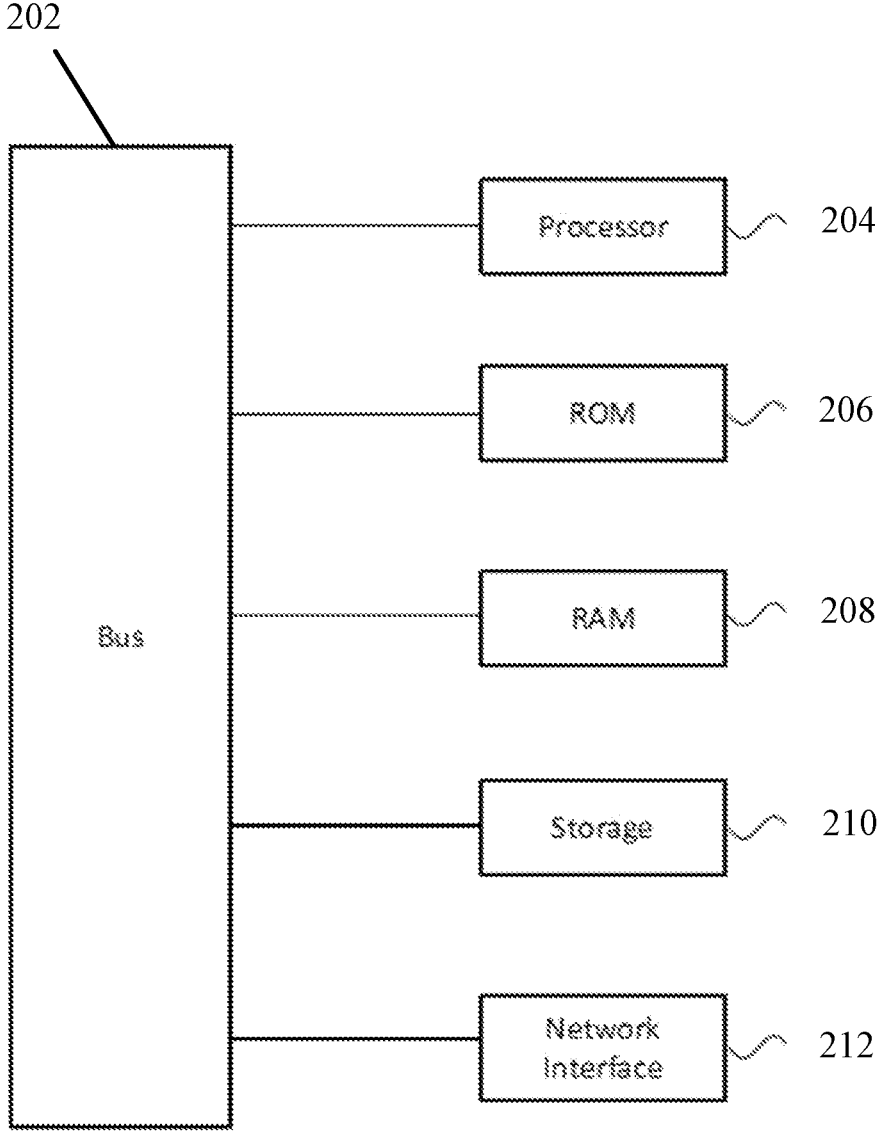
FIG. 2 is a simplified block diagram of one or more devices or systems within the exemplary environment of FIG. 1.

FIG. 2 is a block diagram of an exemplary system and/or device 200 within the environment 100. The device/system 200 includes a processor 204, such as a central processing unit (CPU), controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. For example, as will be described below, the EEG utilization device 108 may include some of the components within the device/system 200 and may also include further components such as one or more sensors. Additionally, and/or alternatively, the device/system 200 may further include components that might not be included within every entity of environment 100.

Referring to FIG. 3 and as mentioned above, the EEG system 300 may be a more detailed example of the EEG utilization device 108 of environment 100. The EEG system 300 includes an EEG device 301 that is wearable by a user (e.g., the user 102). For instance, the EEG device 301 may be a headset that is worn by a user (e.g., including a physically, mentally, visually, and/or audio impaired user). The EEG device 301 may facilitate interactions, communications, and/or exchanges for the user. For instance, the EEG device 301 includes sensory device(s) 302 (e.g., EEG sensors, microphones, and/or image capturing devices). The sensory device(s) 302 may be configured to obtain biosignals, environmental feedback (e.g., sensor feedback), and/or other information. For example, the sensory device(s) 302 may include one or more sensors and/or devices that are configured to obtain biosignals from a user's brain (e.g., electrical activity recorded in an electrogram) and/or environmental information such as audio information (e.g., via a microphone) and/or imaging information (e.g., via an image capturing device). In some variations, the EEG device 301 may be integrated into the accessibility headset device described in U.S. patent application Ser. No. 17/953,270, titled "SYSTEMS AND METHODS FOR USING AN ACCESSIBILITY HEADSET SYSTEM FOR PROVIDING DIRECTIONS TO AUDIO AND VISUALLY IMPAIRED USERS", which is incorporated by reference herein in its entirety. In other variations, the EEG device 301 may communicate with the accessibility headset device described in U.S. patent application Ser. No. 17/953,270 as a separate device of the EEG system 300.

For instance, in some variations, the sensory device(s) 302 may obtain (e.g., detect, sense) a biosignal produced by a brain of the user and/or an environmental signal produced by an environment of the user (e.g., a screen of a user device, an audible question from another entity, and/or a haptic event such as a braille communication) using an EEG. In some examples, based on the type of detected biosignal and/or the type of detected environmental signal, the sensory device(s) 302 may provide the detected biosignal or environmental signal to one or more of the components of the EEG system 300 (e.g., output system 304, processor(s) 306, memory 308, and/or enterprise computing system 316). In some variations, based on detecting the biosignal, the sensory device(s) 302 may provide the detected biosignal or environmental signal to one or more of the components of the EEG system 300 (e.g., output system 304, processor(s) 306, memory 308, and/or enterprise computing system 316). In some instances, based on detecting the environmental signal, the sensory device(s) 302 may detect a biosignal produced by a brain of the user and provide the detected biosignal or environmental signal to one or more of the components of the EEG system 300 (e.g., output system 304, processor(s) 306, memory 308, and/or enterprise computing system 316). In some example, based on receiving an instruction to detect a biosignal produced by the brain of a user (e.g., from processor(s) 306), the sensory device(s) 302 may detect a biosignal produced by a brain of the user and provide the detected biosignal or environmental signal to one or more of the components of the EEG system 300 (e.g., output system 304, processor(s) 306, memory 308, and/or enterprise computing system 316).

The EEG device 301 may further include processor(s) 306. The processor(s) 306 may be any type of hardware and/or software logic, such as a central processing unit (CPU), RASPBERRY PI processor/logic, controller, and/or logic, that executes computer executable instructions for performing the functions, processes, and/or methods described herein. For example, the processor(s) 306 may receive information and/or data (e.g., a detected biosignal and/or environmental signal) from the sensory devices 302 and perform one or more functionalities based on the information. For instance, the processor(s) 306 may instruct output system 304 to provide information and/or data on the detected biosignal and/or environmental signal to one or more of the feedback device 312, enterprise computing system 316, and/or query device 314. Additionally, and/or alternatively, the processor(s) 306 may process the received information and/or data (e.g., EEG signal) on the detected biosignal and/or environmental signal, alone or in combination with memory 308. For example, the processor(s) 306 may preprocess the received EEG signal for inputting into the plurality of ML-AI models. The preprocessing may include, in some instances, applying a dynamic sampling rate to the received data to produce a first set of EEG signals representing the received EEG signal decomposed into its constituent waveforms associated with the relevant frequency bands, and applying a Fast Fourier Transform (FFT) function (e.g., via algorithm) to the wave packet of each frequency band. Additionally, and/or alternatively, the processor(s) 306 may receive the obtained signals and provide them directly to the enterprise computing system 316 for preprocessing and inputting to the frequency ML-AI models. In some examples, the EEG signal may be obtained based on a stimulus (e.g., an image or sound experienced by the user, and the processor(s) 306 may provide the detected biosignal (before or after processing) and information on the stimulus (e.g., the image or sound) to the enterprise computing system 316 for inputting to the ML-AI models.

The EEG device 301 may include an output system 304. The output system 304 may provide output such as audio output, visual output, haptic output and/or other output to the user. For instance, the output system 304 may include a haptic feedback device (e.g., haptic device) that provides haptic feedback to the user. For example, the haptic feedback device may provide a warming or cooling effect, and/or vibrate (e.g., as a therapeutic response based on an identified biosignal). Additionally, and/or alternatively, the output system 304 may include audio output devices (e.g., a microphone/speaker system that is configured to obtain and/or output audio information) and/or visual output devices (e.g., augmented reality (AR) glasses and/or other types of visual output). The audio output devices may output audio information such as instructions to another user or audible consent to an interaction. The visual output devices may output visual information such as text, icons, signals, and/or other types of visual information. The output system 304 may include additional and/or alternative output devices that provide information to another user or perform an action for the user.

The EEG device 301 includes memory 308. In some examples, the memory 308 may be and/or include a computer-usable or computer-readable medium such as, but not limited to, an electronic, magnetic, optical, electromagnetic, infrared, or semiconductor computer-readable medium. More specific examples (e.g., a non-exhaustive list) of the computer-readable medium may include the following: an electrical connection having one or more wires; a tangible medium such as a portable computer diskette, a hard disk, a time-dependent access memory (RAM such as the RAM 208), a ROM such as ROM 206, an erasable programmable read-only memory (EPROM or Flash memory), a compact disc read-only memory (CD_ROM), or other tangible optical or magnetic storage device. The computer-readable medium may store computer-readable instructions/program code for carrying out operations of the present application. For example, when executed by the processor(s) 306, the computer-readable instructions/program code may carry out operations described herein.

The EEG device 301 includes a communication (e.g., network) interface 310. The processor(s) 306 uses the communication interface 310 to communicate with other devices and/or systems within the environment 100. The communication interface 310 may include the functionalities and/or be the network interface 212 shown in FIG. 2. For example, the processor(s) 306 may receive and/or provide information to the user device 104 and/or the enterprise computing system 110 using the communication interface 310. Additionally, and/or alternatively, the communication interface 310 may provide information and/or data on the detected biosignal and/or environmental signal, from the EEG device 301 to one or more of the feedback device 312, enterprise computing system 316, and/or query device 314. For instance, the communication interface 310 may receive information and/or data on a detected biosignal and/or environmental signal from the processor(s) 306, prepare the information and/or data for transmission (e.g., based on the intended component to receive the information and/or data), and provide (e.g., send, transmit) the information and/or data. The communication interface 310 may provide additional and/or alternative outputs, such as instructions and/or determinations to one or more of the feedback device 312, enterprise computing system 316, and/or query device 314. For example, the communication interface 310 may receive a determination from processor(s) 306 that includes instructions for feedback device 312 to generate a specific sensory output based on the one or more detected biosignals, and the communication interface 310 may provide that instruction to the feedback device 312. Additionally, and/or alternatively, the communication interface 310 may receive a determination from processor(s) 306 to provide a determined response to query device 314 (e.g., provide consent or authorization for a given interaction), and the communication interface 310 may provide that response to the query device 314. Additionally, and/or alternatively, the communication interface 310 may receive a determination from processor(s) 306 and provide the determination to the enterprise computing system 316 (e.g., for training one or more ML-AI models).

Additionally, and/or alternatively, the communication interface 310 may be used to communicate with one or more optional devices (e.g., feedback device 312 and/or query device 314). For example, in some instances, the EEG system 300 may include the feedback device 312 (e.g., a wearable haptic device, a smartphone, and/or audio output device) and/or a query device 314 (e.g., a wearable haptic device, smartphone, and/or enterprise pay terminal) instead of the output system 304, or may include the feedback device 312 and/or query device 314 in addition to the output system 304. Accordingly, the feedback device 312 and the query device 314 are denoted using dashed lines to indicate that they are optional. When present, the user of EEG device 301 or a different user may wear the feedback device 312 and/or the query device 314. The feedback and query devices 312, 314 may include one or more communication systems that are configured to provide information to the EEG device 301 and receive information from the EEG device 301 using the communication interface 310. Moreover, the feedback and query devices 312, 314 may include output devices (e.g., haptic feedback devices and visual display devices) that are configured to provide output information to the user, which may be similar to the output system 304. For example, the feedback device 312 may be configured to receive one or more instructions from the EEG device 301 to perform one or more actions, such as produce audible information (e.g., speech, alarms), display an image (e.g., a picture and/or information in visual form), provide a scent or taste (e.g., release a scented aerosol or provide salt to food), and/or generate a haptic sensation (e.g., warmth and touch imitating a hug). Additionally, and/or alternatively, the query device 314 may be configured to receive one or more instructions from the EGG device 301 to perform one or more actions, such as consent to a transaction or unlock a smartphone and/or smartphone application.

While only two external devices 312, 314 and an external system 316 are shown in FIG. 3, the EEG system 300 may include any number of external devices or systems (e.g., zero devices, four devices and two systems, five devices, and so on).

The feedback and query devices 312, 314 may be wearable devices such as haptic vests, AR systems, wrist bands, ankle bands, chest bands, and/or waist bands that the user may wear. For instance, the haptic vests, AR systems, wrist and/or ankle bands may include and/or may be embedded with one or more haptic sensors that are configured to provide haptic feedback to the user. Additionally, and/or alternatively, the feedback and query devices 312, 314 may include and/or be in communication with one or more additional sensors. For instance, the feedback devices may include health sensors to obtain biometric information (e.g., fingerprints or facial recognition) of the user 102. The feedback and query devices 312, 314 may provide the biometric information to the EEG device 301 and/or provide information to the EEG device 301 based on the biometric information (e.g., identifying, by the query device 314, that the user is picking up goods such as medication for another individual and providing to the EEG device 301 a request for consent to accept the goods). In some instances, the wearable devices may be the wearable devices described in U.S. patent application Ser. No. 17/953,270.

Additionally, and/or alternatively, the feedback device 312 and/or the query device 314 may include a processor, memory, and communication interface configured to process one or more detected biosignals (e.g., EEG signals). For example, the sensory device(s) 302 may detect an EEG signal, and the communication interface 310 may provide the detected EEG signal to the feedback device 312 and/or the query device 314. Feedback device 312 and/or query device 314 may then utilize a processor and memory (e.g., processor 204, network interface 212, and any of ROM 206, RAM 208, and storage 210) to breakdown (e.g., designate or identify discrete portions of) the received EEG signal into separate groups of waveforms based on the relevant frequency bands of interest and apply an FFT to the resulting waveforms (e.g., wave packet) of each frequency band. The feedback device 312 and/or query device 314 may then provide the result of the FFT for each detection interval to another device of the EEG system 300 (e.g., the EEG utilization device 301 or the enterprise computing system 316) for inputting the result of the FFT for each frequency band into a respective ML-AI model.

Additionally, and/or alternatively, the feedback device 312 and/or the query device 314 may include a processor memory, and communication interface configured to perform a first action (e.g., take an action) by performing a determination when a second action should be performed (e.g., should be taken) based on the output of the one or more ML-AI models. For example, the feedback device 312 and/or the query device 314 may receive the outputs of the one or more ML-AI models (e.g., an adjusted or approximate amplitude of the respective frequency band, an intensity of the respective frequency band relative to the other frequency bands, a dominant specific frequency within the frequency band and/or a binary indicator or true/false output regarding a sufficient amplitude of the waveform within the frequency band for the respective detection interval) and determine an action to be performed based on comparing the set of outputs from the one or more ML-AI models to a catalogue of actions to be performed where each action corresponds to a specified set of ML-AI model outputs (e.g., a specific combination of outputs from each of the ML-AI models). Based on that determination, the feedback device 312 and/or query device 314 may perform the determined action, such as displaying a visual output by the feedback device 312 or unlocking a smartphone by the query device 314.

Additionally, and/or alternatively, the feedback device 312 and/or the query device 314 may include a processor, memory, and network interface configured to receive an instruction from the EEG device 301 and/or the enterprise computing system 316, such as an instruction determined by the EEG device 301 and/or the enterprise computing system 316 based on the output of one or more of the ML-AI models. The feedback device 312 may then execute the instruction to perform an action based on the instruction. For instance, based on an instruction received from the EEG device 301, the feedback device 312 may vibrate. Additionally, and/or alternatively, based on an instructions received from the enterprise computing system 316, whether directly or indirectly, the query device 314 may be instructed to authorize a transaction, where after the query device 314 then proceeds to authorize the transaction based on the received instruction.

The EEG system 300 is merely exemplary and the EEG system 300 (e.g., the EEG device 301) may include additional or alternative devices, components, and/or sensors as well as perform additional or alternative functions or processes.

Figure 4:
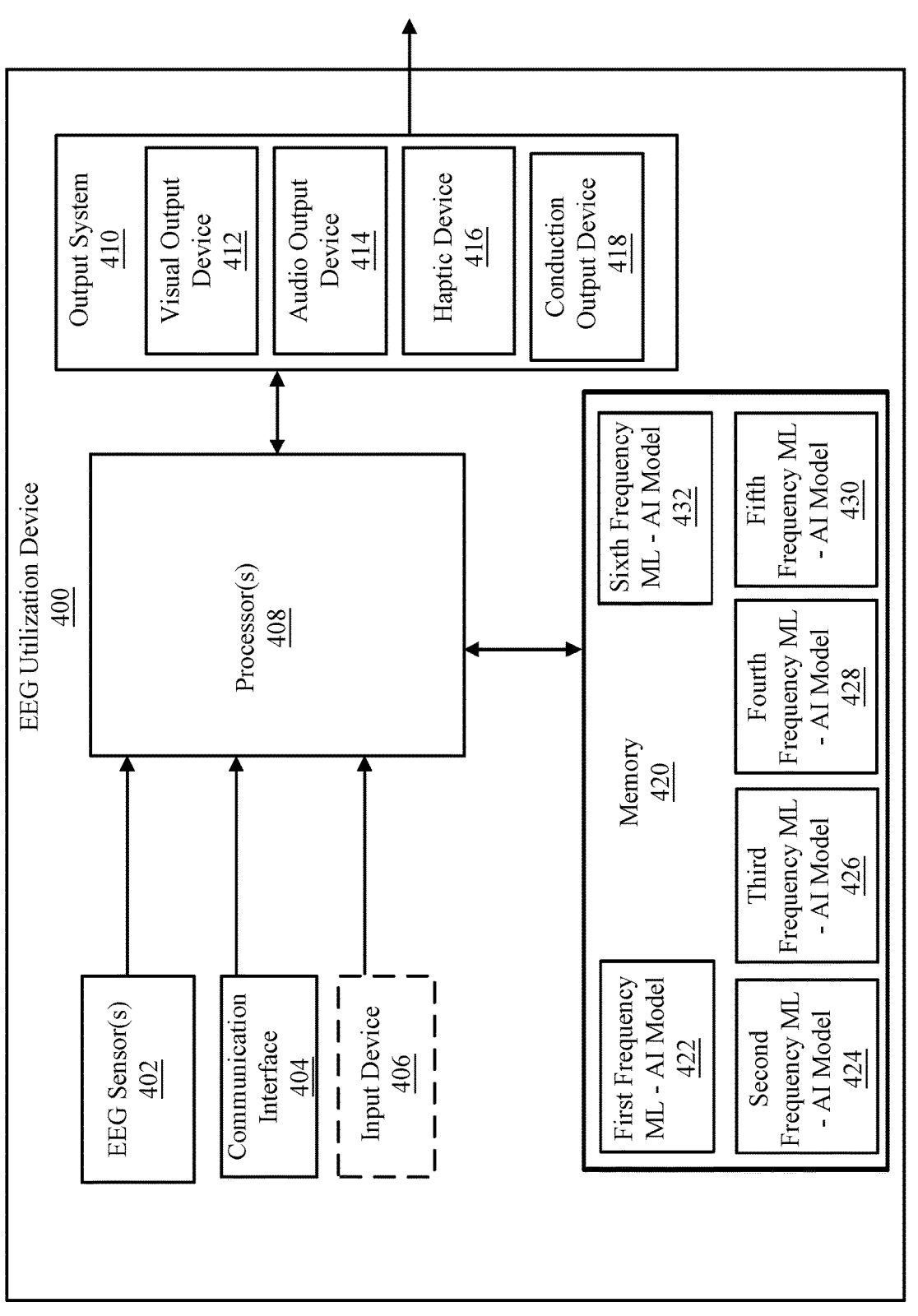
FIG. 4 is a simplified block diagram depicting an exemplary EEG utilization device in accordance with one or more examples of the present application.

FIG. 4 is a simplified block diagram depicting an exemplary EEG utilization device 400 in accordance with one or more examples of the present application. In some examples, the EEG utilization device 400 (e.g., EEG device 400) may be a more detailed example of the EEG utilization device 301 of the EEG system 300. For instance, the sensory device(s) 302 may include and/or be associated with the one or more EEG sensor(s) 402. The output system 410 may be the output system 304. Furthermore, the EEG device 400 shows the communication (e.g., exchange of information) between the components within the EEG device 400.

The processor(s) 408 (e.g., processor 408) of the EEG device 400 may be configured to perform one or more functions and/or processes for the EEG device 400. For instance, the processor 408 may be configured to receive sensor and/or feedback information (e.g., from the EEG sensor(s) 402), process the received sensor and/or feedback information, and/or perform other functions and/or processes. The processor 408 may be the same as or similar to the processor(s) 306 in FIG. 3.

The EEG device 400 may include EEG sensor(s) 402 (e.g., a sensor or array of sensors capable of detecting EEG signals produced by a user's brain) that are configured to obtain biosignal information such as EEG information and provide the EEG information to the processor 408. For instance, a user's brain may produce an EEG signal, which the EEG sensor 402 is able to detect. The EEG sensor 402 may then detect that EEG signal, either passively or actively (e.g., by constantly detecting signals or according to an instruction to detect a signal), and relay the detected EEG signal to processor(s) 408. Then, based on the type of EEG signal (e.g., the relative amplitudes of the waveform of each frequency band), the processor(s) 408 may then provide processed EEG information to each of the frequency ML-AI models 422, 424, 426, 428, 430, and 432 associated with memory 420. In some instances, the EEG sensor(s) 402 may be positioned at different places on user's head or different places on the user's body based on a desired EEG signal detection.

The EEG device 400 may include the communication interface 404, which may be similar to the communication interface 310 from FIG. 3. For instance, the EEG device 400 may receive user input from a user device such as user device 104. For example, the user may provide user input to the user device 104, which may include information instructing the EEG device 400 to detect a biosignal. Additionally, and/or alternatively, the EEG device 400 may be in communication with (e.g., receive from and/or provide information to) one or more external devices (e.g., feedback devices 312, query devices 314) using the communication interface 408.

In some instances, the EEG device 400 includes an input device 406. The dashed lines denote that the input device 406 is optional. When present, the user may provide user input using the input device 406. For instance, the user may provide user input indicating that the EEG sensor(s) 402 should begin detecting an EEG signal.

The EEG utilization device 400 may include memory 420, which may be similar to the memory 308 from FIG. 3. The memory 420 may include the EEG frequency models (e.g., the frequency ML-AI models 422, 424, 426, 428, 430, and 432). The frequency ML-AI models 422, 424, 426, 428, 430, and 432s may be any type of machine learning models such as supervised machine learning models, unsupervised machine learning models, and/or deep learning models, and may include generalized learning models, markov models, and/or hidden markov models. For instance, after receiving one or more of the EEG frequency models, the processor 408 may store them in memory 420. In some instances, the processor 408 may use machine learning/artificial intelligence models/algorithms (e.g., ML-AI models) to determine the action the user intends to perform or to validate the action the user intends to perform. For instance, using the information from the EEG sensors and the ML-AI models, the processor 408 may determine that the wave packet of the respective frequency band corresponds to the wave packet of that same frequency band produced when the user wishes to unlock their user device or play a sound (e.g., a warning tone). Additionally, and/or alternatively, the processor may determine, using the information from the EEG sensors and the ML-AI models, that the user gives their consent in response to a query device requesting consent. The processor 414 may provide output information using an output system 410 (e.g., the audio output device 414) based on the determination. For instance, the audio output device 414 may provide warning tones that are greater in frequency and/or magnitude as a bicycle approaches an immobile user. Additionally, and/or alternatively, the memory 420 allocated for each of ML-AI models 422, 424, 426, 428, 430, and 432 may include, in whole or in part, script (e.g., an algorithm or program) for preprocessing the waveform data as described below.

Additionally, and/or alternatively, the EEG device 400 may be in communication with an enterprise computing system such as enterprise computing system 110. For instance, the enterprise computing system 110 may train one or more ML-AI models, algorithms, and/or datasets. For example, the enterprise computing system 110 may train one or more of the frequency ML-AI models 422, 424, 426, 428, 430, and 432. The enterprise computing system 110 may provide the trained ML-AI models (e.g., the frequency ML-AI models 422, 424, 426, 428, 430, and 432) to the EEG device 400, which the EEG device 400 may store and/or run in memory 420. Using the frequency ML-AI models 422, 424, 426, 428, 430, and 432, the processor 408 may determine whether a received EEG signal contains the correct waveforms for a given action. Additionally, and/or alternatively, the enterprise computing system 110 may train other types of ML-AI models (e.g., waveform processing models), and provide the ML-AI models to the EEG device 400.

The EEG device 400 may include output system 410 such as a visual output device 412, an audio output device 414, a haptic device 416, and/or a conduction output device 418. For instance, the output system 410 may output sensory outputs from one or more of the devices 412, 414, 416, and/or 418. For example, the visual output device 412 may output visual information to the user or another entity. The visual information may include, but is not limited to, text, icons, directional arrows, and/or other visual indicia or visual cues. For instance, the visual output device 412 may be and/or include AR glasses that are configured to provide text and/or images to the user. Additionally, and/or alternatively, the visual output device 412 may provide text and/or images to other entities (e.g., displaying a request for some action or good) as well as causing a display of text and/or images on another entities device (e.g., the AR glasses of another person).

The audio output device 414 may output audio information to the user. For instance, the audio output device 414 may be a speaker system that provides audio to the user or another entity. In some instances, the audio output device 414 may provide audio indicating an instruction or sound based on a though or desire related to a detected EEG signal of the user.

The haptic device 416 may be configured to provide haptic feedback to the user. For instance, the haptic device 416 may include one or more haptic motors and/or heating elements that provide the haptic feedback. In some examples, the haptic feedback may represent an action (such as a hug) based on a though or desire related to a detected EEG signal of the user. Additionally, and/or alternatively, the haptic feedback may indicate alerts. For example, the haptic device 416 may provide haptic feedback pulses (patterned or singular) to another entity when the user recognizes a danger (e.g., a bicycle coming from behind onto the user), provide haptic feedback pules (patterned or singular) to another entity when the user wants to request help (e.g., needing assistance from a nurse), and/or to provide a haptic feedback warmth or pulses to alleviate stress or stiffness on the user's body when the user experiences the stress or stiffness (e.g., warming and/or massaging a muscle or joint).

The conduction output device 418 may be a conduction headphone that is configured to provide conduction information to the user. For instance, the conduction headphone may provide sound waves (e.g., vibrations) at given frequencies through the bones in a user's skull to promote relaxation or a specific EEG frequency. In other words, the EEG device 400 may include a conduction output device 418 (e.g., a small sensor) that is placed over the bone of the individual 102 and provides bone vibrations, which the individual's brain may interpret as sound, based on a detected EGG signal (such as an EEG signal indicating stress or a desire to concentrate).

The EEG utilization device 400 is merely exemplary and may include additional and/or alternative devices, components, and/or sensors as well as perform additional or alternative functions or processes.

FIG. 5 is an exemplary process 500 for using an EEG system in accordance with one or more examples of the present application. The process 500 may be performed by the EEG system 300 and/or the EEG devices 108, 301 and/or 400 shown in FIGS. 1, 3, and 4. However, it will be recognized that any of the following blocks may be performed in any suitable order and that the process 500 may be performed in any suitable environment. The descriptions, illustrations, and processes of FIG. 5 are merely exemplary and the process 500 may use other descriptions, illustrations, and processes for using an EEG system.

At block 502, the EEG system obtains, using one or more EEG sensors, a first set of EEG signals. The first set of EEG signals includes a plurality of first waveforms, and each of the plurality of first waveforms is associated with a frequency band from a plurality of frequency bands. For example, when a user (e.g., user 102) has a thought, that thought is formed with the help of electrical signals in the brain. Those electrical signals come in different types, and may be defined with different waveforms (e.g., frequency and/or amplitude). Typical brain activity may utilize a collection of these electrical signals across multiple different frequencies and different amplitudes between those frequencies to produce a thought or action, which causes the detection of a biosignal (e.g., the collection of these electrical signals) to include a plurality of electrical signals having different amplitudes and frequencies.

For example, the electrical signals may include multiple different waveforms having frequencies ranging from approximately 0.1 Hz to approximately 100 Hz. These waveforms may then be associated with a given frequency band that includes the frequency of the waveform, such as in the delta frequency band (less than 4 Hz), theta frequency band (4 Hz to 7 Hz), low alpha frequency band (8 Hz to 10 Hz), high alpha frequency band (10 Hz to 12 Hz), low beta frequency band (12 Hz to 20 Hz), high beta frequency band (20 Hz to 30 Hz), low gamma frequency band (30 Hz to 50 Hz), and high gamma frequency band (greater than 50 Hz). For instance, when an EEG signal is detected including waveforms with frequencies of 1 Hz, 5 Hz, and 25 Hz, the waveform with a frequency of 1 Hz may be associated with the delta frequency band, the waveform with a frequency of 5 Hz may be associated with the theta frequency band, and the waveform with a frequency of 25 Hz may be associated with the high frequency band. However, the frequency bands may each be based on a different predetermined frequency, and those frequencies may be determined differently based on a given application (e.g., with smaller frequency bands when detecting a more specific signal, with larger frequency bands when detecting different types of signals and/or to reduce computing resource demand, and/or with different frequency boundary values for each frequency band). For example, in some variations, the waveforms may be associated with the delta (0.5 Hz to 4 Hz); theta (4 Hz to 7 Hz); alpha (8 Hz to 12 Hz); sigma (12 Hz to 16 Hz) and beta (16 Hz to 30 Hz) frequency bands.

The one or more EEG sensors (e.g., EEG sensor(s) 402 and/or sensory device(s) 302) may then detect this biosignal (e.g., as a set of EEG signals) including the collection of electrical signal waveforms using an electroencephalogram process, which records the electrical activity occurring in the user's brain. The one or more EEG sensors may be configured to detect all electrical activity occurring in a user's brain that has waveform (e.g., frequency and amplitude) properties, or the one or more EEG sensors may be configured to detect electrical activity occurring within a predefined frequency or amplitude range. The EEG system may then receive the detected set of EEG signals from the one or more EEG sensors automatically and/or continuously (e.g., as a constant stream of EEG signals), in response to a request from the EEG utilization device 108 to detect an EEG signal (e.g., providing an EEG signal measured for a predetermined time or satisfying specified conditions such as frequency or amplitude), and/or at predetermined intervals.

The EEG system may preprocess the received first set of EEG signals. For example, the EEG system may generate a plurality of constituent waveforms of the EEG signal from the first set of EEG signals by sampling the first set of EEG signals in a sequential order. For instance, the EEG sensors may collect EEG data over an extended period of time (e.g., 30 minutes), over very short durations (e.g., a few milliseconds corresponding to an action potential of a neuron during thought), or any other time interval. The portion of the EEG signal corresponding to time period of interest (e.g., timestamped to a coinciding event, such as an introduction of a visual or audio stimulus), or the short duration EEG signal, may be collected with reference to a time scale (e.g., duration of EEG signal and/or exact beginning or end time of a wall clock). The EEG system may then generate the constituent waveforms (e.g., wave packet of the delta frequency band, wave packet of the theta frequency band, etc.) of the EEG signal by recording the properties of the waveforms (e.g., amplitude, frequency, phase, period) in chronological order as they occur (e.g., sequentially) within each frequency band, and associating those properties with the respective frequency band within which they occur. For example, using the frequency bands of delta (less than 3 Hz), theta (3 Hz to 7 Hz), and beta (greater than 14 Hz), the EEG signal may be assigned zero time marker (e.g., the beginning of the relevant EEG signal) and an end time marker (e.g., the end of the entire relevant EEG signal based on the frequency bands of interest) at the end of the delta waveform period, the slowest waveform of the frequency bands of interest. The designated EEG signal should then include the waveforms of interest for each and every frequency band between the zero time marker and the end time marker. The designated EEG signal may then be sampled between the zero time marker and the end time marker to generate the constituent waveforms.

For example, because the waveforms that define the frequency bands are proportionally faster than each other, the speed of the waveform of the slowest frequency band (e.g., delta) may determine the end time marker (e.g., time for one period or interval) and provide the first sampling rate (e.g., one or more samples per time of end time marker). The speed of the waveform of the second slowest frequency band (e.g., theta) may then provide the second sampling rate as a fraction of the first sampling rate (e.g., one or more samples per first fraction of end time marker), where the first fraction is based on the speed of the second slowest frequency relative to the first slowest frequency. The speed of the waveform of the third slowest frequency band (e.g., beta) may then provide the third sampling rate as a second fraction of the end time marker. Additionally, and/or alternatively, the third sampling rate may be based on the first and/or second sampling rate. Accordingly, multiple sampling rates may be applied to a single designated EEG signal (e.g., a first or second set of EEG signals) that becomes faster or slower (e.g., dynamic) based on the speed of the waveforms of the frequency bands of interest.

The sampling time periods of the dynamic sampling rate may be used for multiple users, or may be specific to a single user. For example, while the EEG signals of the different frequency bands experience different speeds when generated by different brains (e.g., by different users), the waveforms typically stay within the same frequency band. As a result, the sampling time periods determined for one user may be generalized and used for the other users. Additionally, and/or alternatively, the generalized sampling time periods (and also the generalized dynamic sampling rate) may be fine-tuned and adjusted for a unique user as necessary (e.g., to improve the accuracy and/or speed of the generalized dynamic sampling rate).

Providing for the collection of the waveforms of each frequency band from the same set of EEG signals provides many advantages. For example, this process may lead to more accurate collection of each individual waveform within an EEG signal and their relative amplitudes and frequencies to other waveforms of the EEG signal. This may allow for a more accurate understanding of the entire EEG response to a stimulus (e.g., the relationship between the theta wave and the gamma wave when shown a certain image), rather isolating one waveform per EEG signal or having to collect multiple EEG signals in order to produce the same effect (e.g., potentially lowering accuracy when other variables cannot be controlled for).

Additionally, and/or alternatively, the EEG system may obtain the first set of EEG signals in response to a predetermined stimulus. For example, the user may use an application that unlocks their smartphone based on an EEG signature. The application may display an image of the user's family member at time t, and instruct the EEG sensors to obtain an EEG signal at the time the image is shown to the user (e.g., displayed on the screen). The EEG sensors may then obtain (e.g., capture) the EEG signal occurring approximately simultaneously to the user viewing and recognizing the image of their family member as the first set of EEG signals. The application may store information and/or data (e.g., the outputs of one or more of the frequency ML-AI models) based on this first set of EEG signals generated in response to the predetermined stimulus of the image as the user's passcode when asking for later authorization. Additionally, and/or alternatively, the image may include a standardized image the application provides to all users (e.g., a logo of the application or an organization associated with the enterprise computing system).

At block 504, the EEG system trains a plurality of ML-AI models using the first set of EEG signals, where each of the plurality of ML-AI models is trained for a different frequency band of the plurality of frequency bands. For example, the EEG device 400 may use the processor(s) 408 to provide the set of detected EEG signals to one or more of the frequency ML-AI models 422, 424, 426, 428, 430, and 432. For instance, when the frequency bands of delta (0.5 Hz to 4 Hz), theta (4 Hz to 7 Hz), alpha (8 Hz to 12 Hz), sigma (12 Hz to 16 Hz), beta (16 Hz to 30 Hz), and gamma (30 Hz to 100 Hz) are used, the first frequency ML-AI model 422 may be trained on properties of waveforms associated with the delta frequency band, the second frequency ML-AI model 424 may be trained on properties of waveforms associated with the theta frequency band, the third frequency ML-AI model 426 may be trained on properties of waveforms associated with the alpha frequency band, the fourth frequency ML-AI model 428 may be trained on properties of waveforms associated with the sigma frequency band, the fifth frequency ML-AI model 430 may be trained on properties of waveforms associated with the beta frequency band, and the sixth frequency ML-AI model 432 may be associated with properties of waveforms associated with the gamma frequency band. The frequency ML-AI models 422, 424, 426, 428, 430, and 432 may then be trained on a baseline EEG signature.

For example, the first set of EEG signals (e.g., including multiple waveforms of different frequencies and amplitudes) may be preprocessed and broken into its respective constituent waveforms as described above. These respective waveforms may be associated with (e.g., placed in) a frequency band that corresponds to the frequency of the waveform. The waveforms associated with a given frequency band (e.g., sigma frequency band) may then be used to train the respective ML-AI model (e.g., fourth frequency ML-AI model 428). For instance, the fourth ML-AI model 428 may receive the waveforms of the first set of EEG signals associated with the sigma frequency band to learn to detect the signature waveform property (e.g., an approximate expected amplitude for a received or predetermined stimulus) of the waveforms of the sigma frequency band. Additionally, and/or alternatively, the frequency ML-AI models may receive the respective frequency band wave packets of the first set of EEG signals and a common stimulus (e.g., a same stimulus that each frequency ML-AI model receives) that caused the first set of EEG signals (e.g., a request for consent, a happy thought, recognition of a family member, remembering a passcode) to learn to identify a baseline amplitude or frequency of the user's EEG signal waveforms.

Additionally, and/or alternatively, the frequency ML-AI models may receive additional conditional data and rely upon this conditional data in combination with the received respective frequency band wave packets (e.g., at block 504 or block 508, as described below) to generate an output. For example, the EEG system may include or be in communication with vitals sensors that may indicate a blood sugar level (e.g., via a glucose monitor), heart rate (e.g., via a heart rate monitor), and/or sensors able to indicate a mental state (e.g., an anxiety, stress, or depression level) of the user. Additionally, and/or alternatively, the EEG system may include or be in communication and/or IOT sensors or objects able to provide a time of day, temperature, and/or weather indication. The frequency ML-AI models may each receive the conditional data from the vitals sensor and/or IOT sensors in addition to the respective frequency band wave packets at block 504 to improve the accuracy of the training of the models based on (e.g., adaptive to) the additional conditional data (e.g., conditions of the user). The frequency ML-AI models may also each receive the conditional data from the vitals sensor and/or IoT sensors in addition to the respective frequency band wave packets at block 508 to generate a more accurate output based on the conditional data.

At block 506, the EEG utilization device 108 obtains, using the one or more EEG sensors, a second set of EEG signals. The second set of EEG signals includes a plurality of second waveforms, and each of the plurality of second waveforms is associated with a frequency band from the plurality of frequency bands. For instance, similar to block 502, the one or more EEG sensors may then detect this second biosignal (e.g., as a set of EEG signals), whether by detecting all electrical activity occurring in a user's brain that has waveform (e.g., frequency and amplitude) properties, or detecting electrical activity occurring within a predefined frequency or amplitude range. The EEG system may then receive the detected set of EEG signals from the one or more EEG sensors automatically and/or continuously (e.g., as a constant stream of EEG signals), in response to a request from the EEG utilization device 108 to detect an EEG signal (e.g., providing an EEG signal measured for a predetermined time or satisfying specified conditions such as frequency or amplitude), and/or at predetermined intervals. The second set of EEG signals may be obtained using the same one or more EEG sensors that obtained the signals of the first set of EEG signals for training the frequency ML-AI models, and from the brain of the same user that generated the first set of EEG signals. Additionally, and/or alternatively, a second set of EEG signals may be obtained from the brain of a different user than the brain of the user that generated the first set of EEG signals for training the frequency ML-AI models. For instance, the frequency ML-AI models may be utilize a data set obtained from one user, and be trained for use with other users (e.g., non-specialized), and/or be trained for use with the same one user (e.g., specialized to the user).

Similar to preprocessing the first set of EEG signals, the second set of EEG signals may be preprocessed sequentially to generate the constituent waveforms. Additionally, and/or alternatively, the first and/or second set of EEG signals may be preprocessed based on applying an FFT function separately to each of the plurality of second waveforms of each frequency band of the plurality of frequency bands. For example, an FFT may be applied to each of the constituent waveforms or waveform groupings for each frequency band (e.g., applying an FFT algorithm to all waveforms of the delta frequency band, and separately applying the same or another FFT algorithm to all waveforms of the beta frequency band) generated from the first or second set of EEG signals. The output of each FFT application may then be provided as an input to their respective frequency ML-AI model (e.g., when the delta frequency band is the first frequency, the output of the FFT applied to the waveforms of the delta frequency band are provided to the first frequency ML-AI model 422). Accordingly, each frequency ML-AI model may be trained to receive the output of an FFT algorithm for their respective frequency band. Additionally, and/or alternatively, computer vision may be used in place of FFT algorithms (and the frequency ML-AI models may be trained to receive the output of the computer vision models).

At block 508, the EEG system inputs each of the plurality of second waveforms associated with the frequency band into a corresponding ML-AI model associated with the respective frequency band to generate a plurality of outputs, where each of the plurality of outputs is associated with a ML-AI model from the plurality of ML-AI models. For example, the EEG device 400 may use the processor(s) 408 to provide the set of detected EEG signals to one or more of the frequency ML-AI models 422, 424, 426, 428, 430, and 432. For instance, using the same frequency bands of delta, theta, alpha, sigma, beta, and gamma, the EEG signal may be decomposed into its constituent waveforms, where each constituent waveform may be associated with a frequency band (e.g., the signal is broken down into a plurality of wave packets, where each wave packet (a plurality of the constituent waveforms) is associated with a single frequency band, or each constituent waveform is associated with a single respective frequency band). The waveforms associated with the first frequency band (e.g., delta frequency band) may be provided as an input to first frequency ML-AI model 422 trained for the delta frequency band, while the waveforms associated with the second frequency band (e.g., theta frequency band) may be provided as input to the second frequency ML-AI model 424 trained for the theta frequency band, and so on as the waveforms of the third (e.g., alpha), fourth (e.g., sigma), fifth (e.g., beta) and sixth (e.g., gamma) frequency bands are each input into their respective frequency ML-AI models. Additionally, and/or alternatively, the sampling rates may be adjusted based on the stimulus provided to generate the EEG signals. For example, for some stimulus a more accurate view of the EEG signal waveforms may occur at different times and/or for different frequency bands (e.g., some stimulus may create waveforms close to the border of the theta/alpha frequency band border, and different stimulus may result in a slightly slower or slightly faster waveform) and the times at which the EEG signal is sampled between the zero time marker and the end time marker may change based on the predetermined stimulus.

Each frequency ML-AI models may be trained to receive the FFT function output applied to the respective frequency band wave packet (e.g., waveforms) of the second set of EEG signals, and may be trained to determine a true/false condition (e.g., true/false flag). The trained frequency ML-AI models (e.g., trained on the EEG data of the first set of EEG signals) may determine that the respective frequency band wave packet satisfies a condition (e.g., a sufficient amplitude and/or a sufficient intensity relative to the intensity to the other frequency band wave packets) and output a true condition. Alternatively, the trained frequency ML-AI models may determine that the respective frequency band wave packet does not satisfy the condition, and may output a false condition. For example, the frequency ML-AI models may be trained to associate a predetermined intensity or amplitude value (e.g., a baseline) for the respective frequency band wave packet (determined based in whole or in part on the first set of EEG signals) to a given action. For instance, a user may have a phobia such as arachnophobia, and when given a stimulus of a spider (e.g., an image or the user seeing a spider near them) the obtained first set of EEG signals may have a very strong or predominant amplitude from one frequency band, e.g., a beta frequency band wave packet, and relatively weaker amplitudes from another frequency band, e.g., an alpha frequency band wave packet, while a stimulus of a sunrise (e.g, an image or the user seeing a sunrise) may have a very strong or predominant amplitude from a theta or alpha frequency band wave packet and a relatively weaker amplitude from the beta frequency band wave packet. Thereafter, when the frequency ML-AI model receives as input data on the respective frequency band wave packets (e.g., the FFT output) of the second set of EEG signals, the frequency ML-AI model may output a true condition when the ML-AI model determines that the respective frequency band wave packet of the second set of EEG signals sufficiently corresponds to the predetermined value. Based on the output of this true condition identifying a feature (e.g., the amplitude or intensity) of the frequency band alone or relative to other frequency bands, a control signal may be sent to generate a trained non verbal response, such as an audio output.

The output of each frequency ML-AI model (e.g., the combination of six different true/false conditions) may be compared to a stored baseline of frequency ML-AI model outputs in order to perform validation. For example, in some instances, an application of the EEG system may receive six outputs of the frequency ML-AI models and compare all six of the outputs to a stored baseline of six outputs (e.g., a specific action baseline or a library of baselines associated with different actions) to determine if each output matches the corresponding baseline, such that all six must match the stored baseline in order to validate an action to perform (e.g., by the EEG system 300 or the EEG utilization device 400). In some instances, the EEG system may receive six outputs of the frequency ML-AI models (e.g., for the alpha, beta, theta, delta sigma, and gamma frequency band wave packets) and compare all six outputs to a stored baseline of four outputs (e.g., alpha, beta, theta, and delta), such that each of the four common frequency band outputs must match, the remaining two received outputs (sigma and gamma) are not necessary to validate an action to perform. In some instances, when the received outputs of the frequency ML-AI models do not match the stored baseline outputs, the EEG system may deny or fail to validate an action to perform (e.g., instructing a feedback device 312 to produce a sensory output, producing (by the feedback device 312) a sensory output providing a response to query device 314, instructing output system 410 to produce a sensory output, and/or producing the sensory output using output system 410).

The EEG system may obtain the second set of EEG signals in response to a predetermined stimulus, and the ML-AI models may select the predetermined value based on the predetermined stimulus. For example, returning to the example of an application displaying an image of the user's family member for authorization, the application may display the same image to the user that was displayed to the user to generate the first set of EEG signals, and provide the stimulus to the frequency ML-AI models. The frequency ML-AI models may then identify which predetermined value is the proper value for determining whether the second set of EEG signals is the correct collection of EEG signals, and provide the output based on the predetermined stimulus. The application may receive the output of each frequency ML-AI model and compare each of these outputs to the outputs of the frequency ML-AI models generated based on first set of EEG signals. If the output based on the second set of EEG signals sufficiently matches the outputs based on the first set of EEG signals, the application may determine that the authorized user is attempting to access the smartphone and allow access to the user (e.g., authorize the request to unlock the smartphone). Additionally, and/or alternatively, the application may produce a sound or vibration pattern alone or in combination with the image of the user's family member and follow a similar process. Additionally, and/or alternatively, the EEG system may have the capability to obtain information and outputs for more frequency bands (e.g., six frequency bands and six frequency ML-AI models) than the application requests and stores (e.g., four frequency bands and the outputs of four frequency ML-AI models). Accordingly, while each of the outputs the application receives based on the second set of EEG signals is compared to each of the outputs based on the first set of EEG signals that the application has stored, the EEG system may provide fewer outputs than the EEG system is capable of providing (e.g., the output of four frequency ML-AI models corresponding to the application's four frequency bands that are considered, and withholding the outputs of the remaining two frequency ML-AI models).

At block 510, the EEG system performs one or more actions based on the plurality of outputs. Additionally, and/or alternatively, the enterprise computing system may provide one or more instructions to the EEG utilization device to direct the EEG utilization device to perform the one or more actions. For example, the EEG system may send a control signal to output system 410 of the EEG device 400 that activates a system of the output system 410 to perform the action of producing the sensory output, or the EEG system may determine a control signal and provide that control signal to the feedback device 312 and/or query device 314, which control signal includes instructions that are then executed by the feedback device 312 and/or query device 314. Additionally, and/or alternatively, the EEG system may determine the control signal for performing the action based on a comparison of each of the outputs of each respective ML-AI model to a corresponding predetermined value for that respective ML-AI model associated with the action.

Additionally, and/or alternatively, performing the one or more actions may include providing, to a user device, a response to a query requesting authentication of a user. For example, a user may enter a pharmacy of an enterprise organization to pick up a prescription for a family member that lists that user as authorized to collect the family member's prescription. In order to be admitted onto this list, the user may have provided to the enterprise computing system a first set of EEG signals and a corresponding stimulus of the first set of EEG signals (e.g., the image or other sensory stimulus that the first set of the EEG signals was generated in response to), or the user may have provided to the enterprise organization a first set of EEG signals generated in response to a stimulus provided by the enterprise organization (e.g., the enterprise logo). The enterprise organization may then preprocess the received first set of EEG signals (e.g., based on an FFT process as in blocks 502 and 504) and the corresponding stimulus to train the frequency ML-AI models for each respective frequency band wave packet of the user's set of EEG signals. For example, the frequency ML-AI models may be trained to identify a relative intensity value of their respective waveforms as a baseline for assessing subsequent set of EEG signals for that stimulus.

The pay terminal of the pharmacy may request consent from the user to collect the prescription on behalf of the family member. The pay terminal may produce the stimulus (e.g., display the image and/or produce the sound), and the user may provide the second set of EEG signals (e.g., obtained using a headset including EEG sensor(s)) to the enterprise computing system (e.g., via a wireless connection with the pay terminal). The enterprise computing system may then preprocess the second set of EEG signals and provide the output for each frequency band wave packet to the respective frequency ML-AI model, and each frequency ML-AI model may determine that the second set of EEG signals sufficiently matches the respective baseline frequency band wave packet first set of EEG signals (e.g., by sufficiently satisfying the condition of matching the predetermined value) and output true, yes, or any other indicator of satisfying the condition in a binary state. Additionally, and/or alternatively, each frequency ML-AI model may output an amplitude value adjusted to compensate for conditional data (e.g., user anxiety levels), a value indicating an intensity of each frequency band relative to the entire second set of EEG signals, and/or another determination based on the respective frequency band wave packet of the received EEG signal. Each frequency ML-AI model may provide their respective output to the pay terminal, and an application of the pay terminal may verify that the received outputs satisfy the stored EEG signature the user provided when registering. The pay terminal may then determine that the user, by providing the second set of EEG signals, provided consent to accept the prescription (e.g., authorized the release of the prescription to the user).

Additionally, and/or alternatively, when the user goes to the pharmacy to collect the prescription for their family member, the pay terminal may simply request consent from the user to collect the prescription on the family member's behalf. The pay terminal may request a simple yes or no response from the user (e.g., from the user's headset). The headset, which may in this instance include the trained frequency ML-AI models stored locally or on a server the headset is in communication with, may obtain the EEG signals generated by the user's brain when the user thinks "yes" and provide the set of EEG signals to the frequency ML-AI models. The headset may then receive the outputs of each frequency ML-AI model and determine that the outputs of the frequency ML-AI models match a stored baseline for "yes." The headset may then provide a "yes" answer (or some other binary input representing yes) to the pay terminal, which the pay terminal accepts as authorization.

Additionally, and/or alternatively, the user may use an application that unlocks their smartphone based on a predetermined combination of frequency band waveforms as described above. For example, the application may use the EEG signal generated by a user as a passcode, such as when the user sees a specific image displayed by the application or hears a specific sound displayed by the application, as the EEG signal may be unique to each user. When the user first sets up the application, the user may choose an image for the application to display (e.g., a family member of the user), which the application displays at time t, and instruct the EEG sensors to obtain an EEG signal at the time the image is shown to the user (e.g., displayed on the screen). The EEG sensors may then obtain (e.g., capture) the EEG signal occurring approximately simultaneously to the user viewing and recognizing the image of their family member as the first set of EEG signals. The application may store information and/or data (e.g., the outputs of one or more of the frequency ML-AI models) based on this first set of EEG signals generated in response to the predetermined stimulus of the image as the user's passcode when asking for later authorization. When the user then later uses the application to unlock their smartphone, the application may display the same image of the user's family member and instruct the EEG sensors to obtain the EEG signal at the time the image is shown to the user. The respective frequency band waveforms of the second set of EEG signals may then be provided for input to each of their respective frequency ML-AI models, and each frequency ML-AI model may output a result. The EEG system and/or the application may then determine that the output of each frequency ML-AI model, when considered together, validates that the second set of EEG signals sufficiently matches the first set of EEG signals. Based on validating the second set of EEG signals, the EEG system may provide a control signal to the application to unlock the smartphone, or send a control signal to accept validation of the second set of EEG signals, which the application uses to unlock the smartphone. Additionally, and/or alternatively, the image may include a standardized image the application provides to all users (e.g., a logo of the application or an organization associated with the enterprise computing system).

The EEG system may include one or more sensory output devices that receive, from the EEG utilization device, the direction (e.g., a control signal) to perform one or more actions, and execute the direction to perform the action. Additionally, and/or alternatively, the EEG system may provide one or more instructions to the EEG utilization device (e.g., via a control signal) to direct the EEG utilization device to perform one or more actions, and may produce a haptic output based on the received direction of the one or more instructions. For example, the haptic output may simulate/mimic the feeling of a hug by providing warmth and applying soft pressure to a user's body, thereby conveying emotion and promoting wellness through social connection. This may be advantageous for isolated individuals, such as seniors who send or receive the simulated hug to or from another isolated person, and/or patients, such as patients in a coma that have limited brain activity. For instance, the EEG system may include a haptic sensory output device (e.g., feedback system 312 and/or haptic device 416) in haptic communication with a user (e.g., in physical and/or thermal contact with the user such as through a haptic vest worn by the user). One or more processors of the haptic sensory output device may be configured to receive, from the EEG utilization device, the direction to perform the one or more actions and to help execute these directions and produce a haptic output.

Additionally, and/or alternatively, the EEG system may provide one or more instructions to the EEG utilization device (e.g., via a control signal) to direct the EEG utilization device to perform one or more actions, and the EEG system may call an emergency service on behalf of the user based on the received direction of the one or more instructions. For example, the frequency ML-AI models may be trained to detect when a user has sustained an injury such as breaking bone and/or desires to request emergency services. Upon providing a set of EEG signals to the frequency ML-AI models and outputting, by the plurality frequency ML-AI models, a combined output indicating that the user has broken bone and/or would like to request emergency services, the EEG system may provide a control signal to a communication interface that notifies or places a call to the emergency service that the user is in need of aid and/or is immobile.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A system, comprising:
an electroencephalogram (EEG) utilization device, comprising:
   one or more EEG sensors configured to detect EEG signals generated by a brain of a user, wherein the one or more EEG signals comprise waveforms corresponding to a plurality of frequency bands; and
   one or more processors configured to provide the detected EEG signals to an enterprise computing system; and
the enterprise computing system, wherein the enterprise computing system is configured to:
   obtain a first set of EEG signals from the EEG utilization device, wherein the first set of EEG signals comprises a plurality of first waveforms, and each of the plurality of first waveforms is associated with a frequency band from the plurality of frequency bands;
   train a plurality of machine learning-artificial intelligence (ML-AI) models using the first set of EEG signals, wherein each of the plurality of ML-AI models is trained for a different frequency band of the plurality of frequency bands;
   obtain a second set of EEG signals from the EEG utilization device, wherein the second set of EEG signals comprises a plurality of second waveforms, and each of the plurality of second waveforms is associated with a frequency band from the plurality of frequency bands;
   input each of the plurality of second waveforms associated with the frequency band into a corresponding ML-AI model associated with the respective frequency band to generate a plurality of outputs, wherein each of the plurality of outputs is associated with a ML-AI model from the plurality of ML-AI models; and
   based on the plurality of outputs from the plurality of ML-AI models and a comparison of each output of the plurality of outputs from the plurality of ML-AI models to a corresponding predetermined value associated with one or more actions for that respective ML-AI model, provide one or more instructions to the EEG utilization device to direct the EEG utilization device to perform the one or more actions.

2. The system of claim 1, wherein performing the one or more actions further comprises providing, to a user device, a response to a query requesting authentication of a user.

3. The system of claim 1, further comprising one or more haptic sensory output devices in haptic communication with a user, comprising one or more processors configured to:
   receive, from the EGG utilization device, the one or more instructions; and
   produce a haptic output based on the received one or more instructions.

4. The system of claim 1, further comprising one or more sensory output devices comprising one or more processors configured to:

receive, from the EEG utilization device, the one or more instructions; and
   execute the one or more instructions to perform the one or more actions by using the one or more one sensory output devices to produce a sensory output comprising at least one of an olfactory, sound, taste, or visual output.

5. The system of claim 1, wherein the one or more EEG sensors are further configured to detect one or more EEG signals in response to a predetermined stimulus, and
   wherein the corresponding predetermined value is used for the comparison based on the predetermined stimulus.

6. The system of claim 1, wherein the one or more processors of the EEG device are further configured to:
   obtain the plurality of second waveforms by sampling the second set of EEG signals in a sequential order using a dynamic sampling rate based on a respective predetermined frequency of each frequency band of the plurality of frequency bands.

7. The system of claim 6, wherein obtaining the plurality of second waveforms further comprises:
   applying a Fast Fourier Transform (FFT) function separately to each of plurality of second waveforms of each frequency band of the plurality of frequency bands, and
   wherein inputting each of the plurality of second waveforms into a corresponding ML-AI model further comprises providing the output of each FFT function to the respective ML-AI model as the plurality of second waveforms.

8. The system of claim 6, wherein the one or more EEG sensors are further configured to detect the second set of EEG signals in response to a predetermined stimulus, and
   wherein the dynamic sampling rate is further based on the predetermined stimulus.

9. A method comprising:
   obtaining, using one or more EEG sensors, a first set of EEG signals, wherein the first set of EEG signals comprises a plurality of first waveforms, and each of the plurality of first waveforms is associated with a frequency band from a plurality of frequency bands;
   training a plurality of machine learning-artificial intelligence (ML-AI) models using the first set of EEG signals, wherein each of the plurality of ML-AI models is trained for a different frequency band of the plurality of frequency bands;
   obtaining, using the one or more EEG sensors, a second set of EEG signals, wherein the second set of EEG signals comprises a plurality of second waveforms, and each of the plurality of second waveforms is associated with a frequency band from the plurality of frequency bands;
   inputting each of the plurality of second waveforms associated with the frequency band into a corresponding ML-AI model associated with the respective frequency band to generate a plurality of outputs, wherein each of the plurality of outputs is associated with a ML-AI model from the plurality of ML-AI models;
   determining a control signal for performing one or more actions based on a comparison of each of the outputs of each respective ML-AI model to a corresponding predetermined value for that respective ML-AI model associated with the one or more actions; and
   performing the one or more actions based on the control signal.

10. The method of claim 9, wherein performing the one or more actions further comprises providing a response to a query, received from a user device, requesting authentication of a user.

11. The method of claim 9, wherein performing the one or more actions further comprises:

providing the control signal to one or more one sensory output devices to produce a sensory output comprising at least one of an olfactory, sound, taste, or visual output.

12. The method of claim 9, wherein performing the one or more actions further comprises:

providing the control signal to one or more one haptic sensory output devices in haptic communication with a user, wherein the control signal directs the one or more one haptic sensory output devices to produce a haptic output.

13. The method of claim 9, wherein obtaining the second set of EEG signals further comprises obtaining, using the one or more EEG sensors, the second set of EEG signals in response to a predetermined stimulus, and wherein the corresponding predetermined value is used for the comparison based on the predetermined stimulus.

14. The method of claim 9, wherein the predetermined value is based on the output of the respective ML-AI model trained on the first set of EEG signals generated by a brain of a same user as the second set of EEG signals.

15. The method of claim 9, further comprising:

generating the plurality of second waveforms by sampling the second set of EEG signals in a sequential order, wherein the sampling rate is a dynamic sampling rate based on each frequency of the plurality of frequency bands, and wherein the plurality of frequency bands are each based on a respective predetermined frequency.

16. The method of claim 15, wherein generating the different waveform subsets further comprises:

applying a Fast Fourier Transform (FFT) function separately to each of plurality of second waveforms of each frequency band of the plurality of frequency bands, and wherein inputting each of the plurality of second waveforms further comprises inputting the output of each FFT function to the respective ML-AI model.

17. The method of claim 15, wherein obtaining the second set of EEG signals further comprises obtaining, using the one or more EEG sensors, the second set of EEG signals in response to a predetermined stimulus, and wherein the dynamic sampling rate is further based on the predetermined stimulus.

18. A non-transitory computer-readable medium having processor-executable instructions stored thereon, wherein the processor-executable instructions, when executed, facilitate:

obtaining, using one or more EEG sensors, a first set of EEG signals, wherein the first set of EEG signals comprises a plurality of first waveforms, and each of the plurality of first waveforms is associated with a frequency band from a plurality of frequency bands;

training a plurality of machine learning-artificial intelligence (ML-AI) models using the first set of EEG signals, wherein each of the plurality of ML-AI models is trained for a different frequency band of the plurality of frequency bands;

obtaining, using the one or more EEG sensors, a second set of EEG signals, wherein the second set of EEG signals comprises a plurality of second waveforms, and each of the plurality of second waveforms is associated with a frequency band from the plurality of frequency bands;

inputting each of the plurality of second waveforms associated with the frequency band into a corresponding ML-AI model associated with the respective frequency band to generate a plurality of outputs, wherein each of the plurality of outputs is associated with a ML-AI model from the plurality of ML-AI models;

determining a control signal for performing one or more actions based on a comparison of each of the outputs of each respective ML-AI model to a corresponding predetermined value for that respective ML-AI model associated with the one or more actions; and performing the one or more actions based on the control signal.

19. The non-transitory computer-readable medium of claim 18, wherein obtaining the second set of EEG signals further comprises obtaining, using the one or more EEG sensors, the second set of EEG signals in response to a predetermined stimulus, and wherein the corresponding predetermined value is used for the comparison based on the predetermined stimulus.

20. The non-transitory computer-readable medium of claim 18, wherein the predetermined value is based on the output of the respective ML-AI model trained on the first set of EEG signals generated by a brain of a same user as the second set of EEG signals.

* * * * *